W. F. FARNSWORTH.
LOCK WASHER.
APPLICATION FILED AUG. 28, 1919.
1,335,944. Patented Apr. 6, 1920.
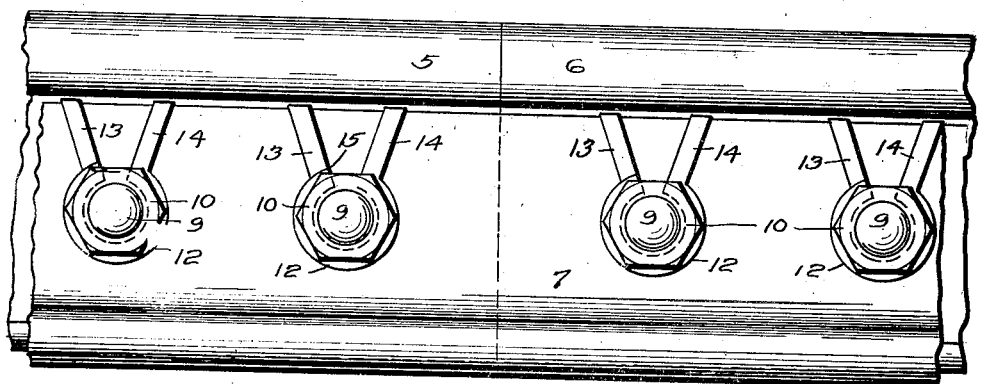
Fig. 1.
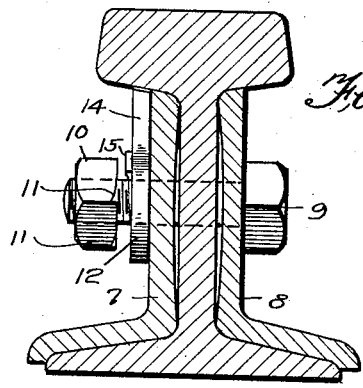
Fig. 2.
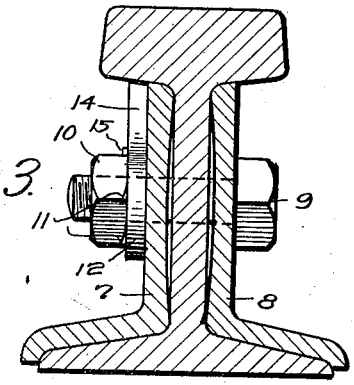
Fig. 3.
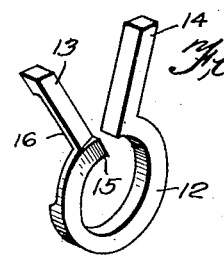
Fig. 4.
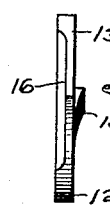
Fig. 5.
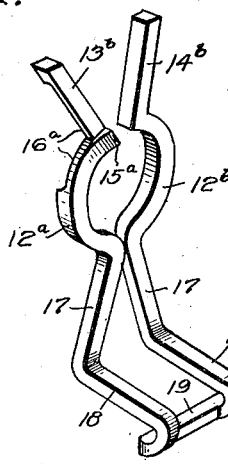
Fig. 6.
Fig. 7.
Witnesses
R. D. Stockman
Inventor
William F. Farnsworth,
By James H. Lyles
Attorney

UNITED STATES PATENT OFFICE.

WILLIAM F. FARNSWORTH, OF WASHINGTON, DISTRICT OF COLUMBIA.

LOCK-WASHER.

1,335,944.

Specification of Letters Patent.

Patented Apr. 6, 1920.

Application filed August 28, 1919. Serial No. 320,480.

*To all whom it may concern:*

Be it known that I, WILLIAM F. FARNSWORTH, a citizen of the United States, residing at Washington, in the District of Columbia, have invented certain new and useful Improvements in Lock-Washers, of which the following is a specification.

This invention relates to nut locks and more particularly to a nut locking washer adapted for use in connection with rail joints. It is a primary object of the invention to provide a nut locking structure of the character indicated of the utmost simplicity and one capable of being manufactured at a very small cost.

In the accompanying drawing in which like characters of reference designate corresponding parts throughout the several views—

Figure 1 is a fragmentary side elevation of a fish plate and the ends of abutting rails to which said fish plate is applied;

Fig. 2 is a transverse vertical, sectional view illustrating one of the securing nuts and bolts in elevation and with the parts in the position they occupy before the nut is screwed up;

Fig. 3 is a view like Fig. 2 but illustrating the nut in its tightened and locked position;

Fig. 4 is a perspective view of a lock washer of the type illustrated in Figs. 1, 2 and 3;

Fig. 5 is an edge elevation of the lock washer illustrated in Fig. 4;

Fig. 6 is a detailed perspective view of a modified form of nut locking structure; and Fig. 7 is a perspective view of a further modification.

In the drawing 5 and 6 designate the abutting ends of railroad rails and 7 and 8 the usual fish plate employed in conjunction therewith. The securing bolts 9 are of usual construction, but the nuts 10 are provided with ratchet teeth 11 upon their inner faces. The form of the invention illustrated in Figs. 1 to 5 includes a bolt embracing body portion 12 and divergent arms 13 and 14 carried thereby, which are of sufficient length to extend to and engage with the under side of the ball portion of the rail whereby the lock washer is held against turning in either direction. The arm 13 prevents turning of the washer during the time that the nut is being screwed up and the arm 14 prevents turning of the washer under the tendency of the nut to unscrew, it being understood that at this time the ratchet teeth 11 of the nuts are engaged by pawl teeth 15 formed at the juncture of the body portion 12 and the arm 13. To permit the necessary yielding movement of this tooth, the arm 13 and the body portion 12 are cut away upon their rear faces as indicated at 16. The form of the invention illustrated in Fig. 7 is substantially the same as that illustrated in Figs. 1 to 5 except that in Fig. 7 an extension 14$^a$ is provided upon the arm 14, which constitutes an abutment to underlie the ball portion of the rail.

In the form of the invention illustrated in Fig. 6 arms 13$^b$ and 14$^b$, corresponding to the arms 13 and 14 of Fig. 4, project from semi-circular halves 12$^a$ and 12$^b$, which complementally constitute a bolt embracing portion, a cut away portion 16$^a$ serves the function of the cut away portion 16 previously referred to and the same is true of a pawl tooth 15$^a$ formed at the juncture of the half 12$^a$ and the arm 13$^b$. Divergent legs 17 carry outwardly directed feet 18 which are bent downwardly and inwardly and are united by a transverse toe 19. The feet 18 extend downwardly over the upper surfaces of the fish plate, and the toe 19 engages beneath the lower edge of the fish plate, by virtue of which construction the washer is rigidly held against movement in any direction.

I am well aware of the fact that it has heretofore been proposed to provide lock washers to engage between the rear faces of the nuts and portions of the fish plate structure of a rail joint. However, it is to be noted that the present construction is one of the utmost simplicity and one capable of great economy in manufacture. The several forms of the invention may be made of bar metal, bent to the proper shape and these may be fashioned at great speed with unskilled labor.

It is to be understood that the invention is not limited to the precise construction set forth but that it includes within its purview whatever changes fairly come within either terms or the spirit of the appended claims.

Having described my invention, what I claim is—

1. A device of the character described comprising a substantially circular bolt embracing body portion, upwardly extending divergent arms carried by said body portion and a pawl tooth located at the juncture of said body portion and one of said arms.

2. A structure as recited in claim 1 wherein said arm and said body portion are cut away at the rear to permit yielding movement of said tooth.

3. A device of the character described formed of a continuous piece of metal bent to form a bolt embracing body portion, upwardly extending divergent arms, downwardly extending divergent legs, outwardly extending feet carried by said legs, inturned portions carried by said feet adapted to engage over the edge of the fish plate and a pawl tooth at the juncture of said body portion and one of the upwardly extending arms.

4. A structure as recited in claim 3 in combination with a transverse toe connecting the inturned portions of said feet.

5. A structure as recited in claim 3 wherein said body portion and one of the upwardly extending arms is cut away at a point in the rear of said tooth.

In testimony whereof I affix my signature.

WILLIAM F. FARNSWORTH.